(12) United States Patent
Schaefer et al.

(10) Patent No.: US 8,894,766 B2
(45) Date of Patent: Nov. 25, 2014

(54) PROCESS FOR PRODUCTION OF POLYCRYSTALLINE SILICON

(75) Inventors: Marcus Schaefer, Traunstein (DE); Oliver Kraetzschmar, Burgkirchen (DE)

(73) Assignee: Wacker Chemie AG, Munich (DE)

(*) Notice: Subject to any disclaimer, the term of this patent is extended or adjusted under 35 U.S.C. 154(b) by 765 days.

(21) Appl. No.: 13/214,321

(22) Filed: Aug. 22, 2011

(65) Prior Publication Data
US 2012/0048178 A1 Mar. 1, 2012

(30) Foreign Application Priority Data
Sep. 1, 2010 (DE) .......... 10 2010 040 093

(51) Int. Cl.
*C30B 21/02* (2006.01)
*C01B 33/035* (2006.01)
(52) U.S. Cl.
CPC .................. *C01B 33/035* (2013.01)
USPC ............ 117/87; 117/86; 117/94; 117/95; 117/100; 423/349
(58) Field of Classification Search
USPC .......... 117/86, 100, 94, 95, 101, 87; 423/349
See application file for complete search history.

(56) References Cited

U.S. PATENT DOCUMENTS

| | | | |
|---|---|---|---|
| 4,148,931 A | 4/1979 | Reuschel et al. | |
| 4,311,545 A | 1/1982 | Bugl et al. | |
| 2002/0088401 A1 | 7/2002 | Hertlein et al. | |
| 2005/0135986 A1 | 6/2005 | Weidhaus et al. | |
| 2008/0286550 A1 | 11/2008 | Sofin et al. | |
| 2009/0136666 A1 | 5/2009 | Endoh et al. | |
| 2010/0219380 A1 | 9/2010 | Hertlein et al. | |
| 2012/0148728 A1* | 6/2012 | Canle et al. ................ | 427/58 |
| 2013/0149228 A1* | 6/2013 | Martinez et al. ........... | 423/349 |

FOREIGN PATENT DOCUMENTS

| | | |
|---|---|---|
| CN | 1663911 A | 9/2005 |
| DE | 29 12 661 A1 | 10/1980 |
| DE | 10 2007 023 041 A1 | 11/2008 |
| DE | 10 2007 047 210 A1 | 4/2009 |
| EP | 1223146 A1 | 7/2002 |
| EP | 2 067 744 A2 | 6/2009 |
| EP | 2 077 252 A2 | 7/2009 |
| JP | 2003128492 A | 5/2003 |

OTHER PUBLICATIONS

PatBase abstract in English for JP 2003-128492.
Dittmann/Fischer/Huhn/Klinger, "Repetitorium der technischen Thermodynamik" [Refresher in Engineering Thermodynamics], Teubner Verlag (1995).

* cited by examiner

*Primary Examiner* — Bob M Kunemund
(74) *Attorney, Agent, or Firm* — Caesar, Rivise, Bernstein, Cohen & Pokotilow, Ltd.

(57) ABSTRACT

The invention provides a process for producing polycrystalline silicon, including introduction of a reaction gas containing a silicon-containing component and hydrogen by means of one or more nozzles into a reactor including at least one heated filament rod on which silicon is deposited, wherein an Archimedes number $Ar_n$ which describes flow conditions in the reactor, as a function of the fill level FL which states the ratio of one rod volume to one empty reactor volume in percent, for a fill level FL of up to 5% is within the range limited at the lower end by the function $Ar = 2000 \times FL^{-0.6}$ and at the upper end by the function $Ar = 17\,000 \times FL^{-0.9}$, and at a fill level of greater than 5% is within a range from at least 750 to at most 4000.

10 Claims, 1 Drawing Sheet

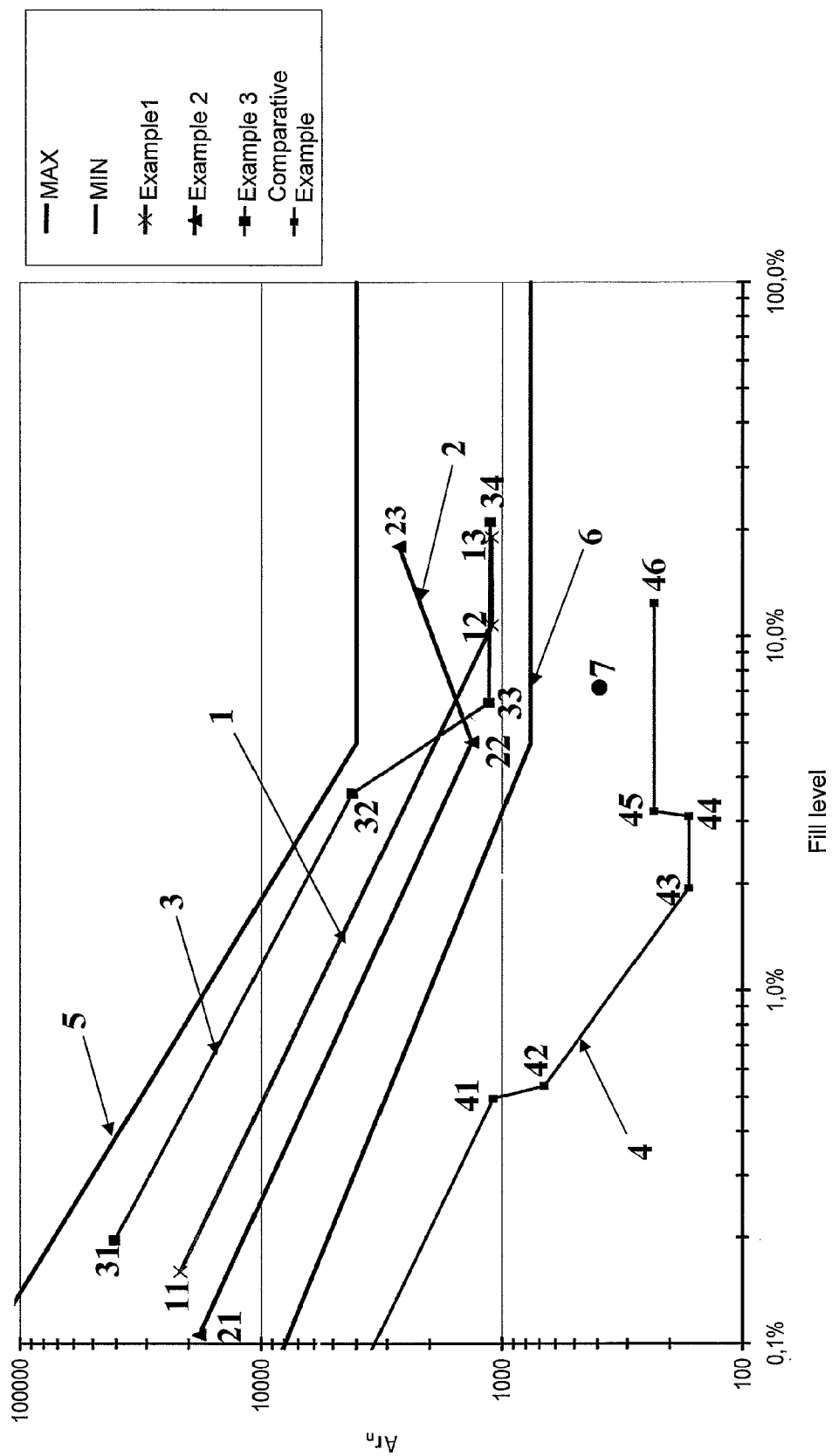

PROCESS FOR PRODUCTION OF POLYCRYSTALLINE SILICON

BACKGROUND OF THE INVENTION

The invention relates to a process for production of polycrystalline silicon.

Polycrystalline silicon (polysilicon for short) serves as starting material in the production of monocrystalline silicon by means of crucible pulling (Czochralski or CZ process) or by means of zone melting (Floatzone or FZ process). This monocrystalline silicon is separated into wafers and, after a multitude of mechanical, chemical and chemomechanical processing operations, used in the semiconductor industry for manufacture of electronic components (chips).

More particularly, however, polycrystalline silicon is required to an increased extent for production of mono- or polycrystalline silicon by means of pulling or casting processes, this mono- or polycrystalline silicon serving for manufacture of solar cells for photovoltaics.

The polycrystalline silicon is typically produced by means of the Siemens process. In this process, thin filament rods ("thin rods") of silicon are heated by direct passage of current in a bell-shaped reactor ("Siemens reactor"), and a reaction gas comprising a silicon-containing component and hydrogen is introduced.

The silicon-containing component of the reaction gas is generally monosilane or a halosilane of the general composition $SiH_nX_{4-n}$ (n=0, 1, 2, 3; X=Cl, Br, I). It is preferably a chlorosilane or chlorosilane mixture, more preferably trichlorosilane. Predominantly $SiH_4$ or $SiHCl_3$ (trichlorosilane, TCS) is used in a mixture with hydrogen.

EP 2 077 252 A2 describes the typical structure of a reactor type used in the production of polysilicon.

The reactor base is provided with electrodes which accommodate the thin rods onto which silicon is deposited during the growth operation, and which thus grow to become the desired rods of polysilicon. Typically, in each case two thin rods are connected with a bridge to give a thin rod pair, which forms a circuit via the electrodes and via external devices, and this serves to heat the rod pairs to a particular temperature.

The rod temperature is typically measured with radiation pyrometers at the surfaces of the vertical rods.

The rod temperature is typically set by regulating the electrical power, either in a fixed manner or else as a function of the rod diameter.

In addition, the reactor base is additionally provided with nozzles which supply the reactor with fresh gas. The offgas is conducted back out of the reaction chamber via orifices.

The amount of reaction gases supplied is typically varied as a function of the rod diameter, i.e. generally increases with increasing rod diameter.

At the heated rods and the bridge, high-purity polysilicon is deposited, as a result of which the rod diameter grows with time (CVD=chemical vapor deposition/gas phase deposition).

The resulting polysilicon rods, after the deposition operation has ended, have to be processed to give lumps and chips, unless they are intended for the production of single crystals by the FZ process.

In the latter case, the polysilicon rods are used to produce, by zone melting, monocrystalline silicon ingots which are processed further at a later stage to give silicon wafers.

In order to produce silicon chunks for CZ or solar, the rods are mechanically comminuted with tools such as hammers, crushers or mills and then classified by size. The size of the silicon pieces ranges from about 1 mm up to pieces of 150 mm or more. The shape of the pieces should typically not deviate too greatly from the spherical form.

All known processes for deposition of polysilicon which are based on the Siemens process have disadvantages with regard to the product quality achieved and the economic viability of the production process.

Disadvantages with regard to the product quality are especially an often observed axial variation in the rod diameter, and in some cases poor surface characteristics of the rods.

The processes often require an elevated level of energy.

In some cases, the rods fall over in the reactor.

Finally, silicon dust forms in some processes.

In some processes, there is overheating and, in the worst case, even melting of the silicon carrier body (rods and bridges).

DE 29 12 661A1 describes a process for producing of polycrystalline silicon, in which partly liquid trichlorosilane is introduced into the reactor chamber by means of a specific nozzle (two-jet nozzle). This is intended to increase the proportion of trichlorosilane in the reaction gas and ultimately to achieve a higher output. It has been found here, however, that the specific energy consumption is much too high.

In EP 2 077 252 A2, it is considered to be advantageous from a process technology point of view to switch nozzles for the reaction gas supply on and off during the deposition process. For this purpose, the proportion of closed nozzles is regulated as a function of process time or rod diameter.

The aim of this measure is, with growing rod diameter, to ensure optimal gas supply of all rods—especially within the upper range.

EP 2 067 744 A2 discloses a production process for polycrystalline silicon, in which the inflow rate of the reaction gas by which silicon is deposited, after a first stabilization step, is increased first significantly and then more slowly in order to improve the supply of the thin rods with reaction gas, and is then reduced in the growth step in order to ensure efficient deposition. It is emphasized that merely the supply with reaction gas is regulated, and hence no modifications whatsoever to the reactors are required.

However, the processes described in EP 2 077 252 A2 and in EP 2 067 744 A2 exhibit an increased number of rods falling over. This is probably connected to the abrupt changes in the inflow rates of the reaction gas.

The length of the thin rods used may be several meters (about 2-3 m is customary). When falling over, rods can also knock over other adjacent rods.

This causes considerable economic damage, especially when silicon rods contaminated in this way have to be cleaned in a complex manner, or even the reactor is damaged when the rods fall over.

If this occurs before the end of the deposition process, the deposition operation has to be stopped immediately in order to recover the rods which have fallen over. This has direct effects on the economic viability of the corresponding plant. The more rods are present in the reactor, the greater the economic damage. On the other hand, high economic viability in normal operation is coupled directly to a high number of rods in the reactor.

A further disadvantage of the process disclosed in EP 2 067 744 A2 is that it is apparently impossible to achieve a constant geometry or morphology over the entire rod length and at the same time a sufficiently high deposition rate.

The geometry of a silicon rod during the deposition process corresponds ideally to a cylinder of growing radius. Deviations from this cylinder form can cause disruption to the process. In the most unfavorable case, rods can fuse together and stop the deposition operation. With regard to the deviation mentioned, if the result is a conical shape narrowing in the downward direction, there is again also an increased risk that the rods will fall over due to the less favorable weight distribution.

The requirements on polysilicon rods which are to be used later for the float zone process are particularly strict. Before use, the rods are ground to a nominal diameter with a round shape. Any exceedance of the target diameter means that an increased amount of material is removed in the round grinding and hence valuable silicon is lost. If the diameter is ever lower than the target diameter, on the other hand, the length of the rod piece to be used is reduced and hence the economic viability of the target product is worsened.

Rods of polysilicon can be described not only in terms of length and diameter but also by means of further parameters: the nature of the surface of the rod may be different. The rod may have a cauliflower-like surface. The rod may, however, also have a substantially smooth surface. The overall properties of the surface of the rod shall be referred to hereinafter by the term "morphology".

It is known that primarily a high mean deposition rate is crucial for a high productivity and hence for the economic viability of the process. There is therefore an effort to maximize the deposition rate if possible. However, a higher deposition rate usually requires process conditions which have an adverse effect, for example, on the morphology.

DE 102 007 047 210 A1 discloses a process which leads to polysilicon rods with advantageous flexural strength. Moreover, the specific energy consumption in this process is particularly low. In terms of process technology, a maximum value of the flow rate of the chlorosilane mixture is attained within fewer than 30 hours, preferably within fewer than 5 hours, the temperature at the underside of the bridge being between 1300° C. and 1413° C.

However, a problem is that the temperature in the interior of the bridge can be higher than the temperature at the bridge surface, which is maintained between 1300° C. and 1413° C. according to DE 102 007 047 210 A1.

The temperature is regulated by the electrical current in rod and bridge. In order to be able to maintain the temperature in the event of cooling of the bridge surface by inflowing gas, the electrical current has to be increased.

Semiconductors such as silicon are known to have the property that the electrical resistance thereof decreases with increasing temperature.

Since the temperature in the interior of a heated rod is higher than at the surface thereof, which is cooled by the reaction gas, the electrical resistance in the interior of the rod and of the bridge is lower. Thus, the current flow in the interior of the bridge is higher.

In the limiting case of a high thermal flow due to significant cooling of the surface of the bridge by the reaction gases, this can lead to a temperature in the interior of the bridge which is above the melting point of silicon (1413° C.). This results in what is called "bridge leakage", which leads inevitably to a stoppage of the deposition process.

DE 10 2007 047 210 A1 describes a process in which the probability of the bridge leakage is significantly increased.

This could be prevented only by reduction of the bridge temperature, which, however, would again nullify the advantages of the comparatively high deposition rate and of the improved energy efficiency.

DE 10 2007 023 041 A1 describes a further process for production of polysilicon, specifically for FZ (float zone) silicon. It envisages, up to a rod diameter of 30 mm, a rod temperature of 950 to 1090° C. and a particular proportion of chlorosilanes in the reaction gas, and, no later than after attainment of a rod diameter of 120 mm, switching of the rod temperature to 930 to 1030° C. and increasing the proportion of chlorosilanes in the reaction gas. Abrupt changes in the growth conditions must not be made over the entire deposition time.

Rods of polysilicon which are used for production of FZ silicon are brought to the desired diameter typically by means of mechanical processing after the deposition. In order to minimize the loss of silicon, all the rods produced should have the same diameter over the entire length. In addition, the cross section of the rods should be round over the entire length.

However, the rods of polysilicon produced according to DE 10 2007 023 041 A1 exhibit a geometry which is insufficiently constant with regard to the diameter as a function of the length of the crystals. The diameter varies with the length of the crystal, which has the result that more material has to be removed on one side in order to obtain the nominal diameter after mechanical processing. This reduces the economic viability of the process.

A further problem which often occurs in the prior art is dust deposition.

Dust deposition is referred to when the silicon-containing gas is not deposited at the surface of the rods (heterogeneous deposition), but rather reacts to give silicon in the free volume (homogeneous deposition).

The dust thus formed is firstly found at the base of the reactor at the end of the deposition process and has to be disposed of at a later stage.

Secondly, it is transported with the offgas to the offgas processing, where it can cause disruption.

Severe dust deposition can force stoppage of the deposition process. This reduces the economic viability.

In addition, it causes considerable problems in the industrial plants and associated additional cost and inconvenience.

Unfortunately, it is found that specifically deposition processes with a particularly high deposition rate lead in some cases to increased dust deposition.

Overall, it has not been possible in the prior art to date to harmonize the different aspects which are important in the deposition of polysilicon.

This problem gave rise to the objective of the present invention.

SUMMARY OF THE INVENTION

The object of the invention is achieved by a process for producing polycrystalline silicon, comprising introduction of a reaction gas comprising a silicon-containing component and hydrogen by means of one or more nozzles into a reactor comprising at least one heated filament rod on which silicon is deposited, wherein an Archimedes number $Ar_n$, which describes flow conditions in the reactor as a function of the fill level FL which states the ratio of a rod volume to an empty reactor volume in percent, for a fill level FL of up to 5% is within the range limited at the lower end by the function $Ar=2000 \times FL^{-0.6}$ and at the upper end by the function $Ar=17000 \times FL^{-0.9}$, and at a fill level of greater than 5% is within a range from at least 750 to at most 4000.

It is essential for the success of the process to conduct the process such that the Archimedes number, which describes the flow conditions in the reactor as the ratio of free to forced convection, lies within a defined range. This range is defined for the entire process duration.

For this purpose, the Archimedes number is reported as a function of the fill level of the reactor.

The fill level of a reactor states the ratio of the volume of the rods to the empty volume of the reactor in percent. The empty volume of the reactor is constant.

The fill level thus increases with increasing process duration since the volume of the rods increases.

It is particularly advantageous that the process and the inventive range for the Archimedes number are independent of the size of the reactor. The process is thus suitable both for small and for larger reactor types.

The process is likewise independent of the number and also of the length of the filament rods which are present in the reactor and on which silicon is deposited.

The general description of flow conditions in a vessel by means of the Archimedes number is known from engineering thermodynamics textbooks, for example Dittmann/Fischer/Huhn/Klinger, "Repetitorium der technischen Thermodynamik" [Refresher in Engineering Thermodynamics], Teubner Verlag (1995).

The Archimedes number is also known by the name "Richardson number".

For Siemens reactors for deposition of polycrystalline silicon, no assessments have yet been made with regard to the Archimedes number.

A Siemens reactor used in the deposition of silicon can be considered as a vessel with a certain volume (empty volume), the volume being bounded by walls with a particular temperature $T_{wall}$. In addition, this space contains rods which grow with time as a result of deposition of silicon and have a particular temperature $T_{rod}$.

Gas is heated at the hot rods and rises upward. At the walls, the gas is cooled again and falls downward. This is referred to as free convection of the gas.

In addition, reaction gas (gases containing hydrogen and silicon, for example a mixture of trichlorosilane and dichlorosilane) is introduced actively into this space by nozzles, typically mounted at the base, with a defined inflow rate. This causes forced convection.

At the same time, offgas is withdrawn from the vessel, and the pressure in the vessel is typically kept constant.

The free convection leads to a buoyancy force, the forced convection to an inertia force. It has been found that the interaction of these two flow forces apparently dominate the complex flow conditions and the effects thereof on the deposition in the reactor. Thus, the Archimedes number, which is defined as the ratio of buoyancy force to inertia force, is suitable for characterization of the flow conditions.

The specific derivation of the Archimedes number Ar for a rod in a Siemens reactor is not reproduced here.

The result is the following relationship:

$$Ar = *\pi*g*L^3*A_d*(T_{rod}-T_{wall})/(2*Q^2*(T_{rod}+T_{wall}))$$

where g is the acceleration due to gravity and m/s², L is the rod length of the filament rods in m, Q is the volume flow of the gas in m³/s under operating conditions (p, T), $A_d$ is the sum of all nozzle cross-sectional areas in m², $T_{rod}$ is the rod temperature in K and $T_{wall}$ is the wall temperature in K.

The length of the filament rods remains essentially constant during the deposition, for example L=3 m.

When the reactor comprises, for introduction of reaction gases, one or more nozzles with the same or different cross sections, the sum of all nozzle cross sections $A_d$ (in m²) is taken into account.

The cross section of one or more nozzles may also be variable with time.

The sum of all cross sections $A_d$ is preferably at least $5\times10^{-5}$ m² up to about $1\times10^{-2}$ m².

The rod temperature is preferably 1150 K to 1600 K.

The wall temperature is preferably 300 K to 700 K.

The volume flow is preferably 0.001 m³/s to 0.5 m³/s under operating conditions.

In the case of several filament rods in one reactor, the Archimedes number is determined as the sum over the number n of these rods. The result is $Ar_n$.

The equation is then:

$$Ar_n = n*Ar$$

However, the process according to the invention is—as already mentioned above—independent of the number of rods in the reactor.

The inventors have recognized that merely doubling the volume flow of reaction gases when doubling the number of rods in the reactor does not lead to success since such a process shows a dependence of the Archimedes number on the fill level, which is below the range claimed. The process also has an increased specific energy consumption and additionally an increased proportion of rods which have fallen over. If, in contrast, the nozzle configuration is also adjusted, for example, it is possible to achieve lower proportions of rods which have fallen over and a lower specific energy consumption. It has been found that an optimal process in the case of doubling of the number of rods in turn requires flow conditions which correspond to those claimed in the process according to the invention.

It has been found that, for all processes for which the Archimedes number for a fill level FL of up to 5% is within the range limited at the lower end by the function $Ar=2000\times FL^{-0.6}$ and at the upper end by the function $Ar=17\,000\times FL^{-0.9}$, and at a fill level of greater than 5% is within a range from at least 750 to at most 4000, the following advantageous technical effects occur simultaneously and reproducibly:

Barely any dust deposition is observed at mean deposition rates equal to or higher than in the prior art.

When the process according to the invention is performed, no rod and/or bridge leakage occurs.

In the context of the invention, the rod temperature is measured with radiation pyrometers at the surfaces of the vertical rods, preferably at the side of the rod closest to the outer wall of the reactor, at half the height of the rod. The surface temperature is thus regulated in the middle of the rod. Therefore, in conjunction with the optimal flow conditions over the entire reactor, leakage of the bridge is prevented.

It has been found that the proportion of the rods which have fallen over in these processes is much lower than in the processes known from the prior art.

All polycrystalline rods which have been obtained by inventive processes have a smaller variation in diameter over the rod length compared to the prior art.

It has also been found that the morphology of silicon rods in the process according to the invention is firstly independent of the axial position on the rod, but secondly is also independent of the position of the rod in the deposition plant, i.e. all the rods irrespective of position have such an advantageous morphology.

BRIEF DESCRIPTION OF THE DRAWING

The invention is illustrated hereinafter with reference to a figure.

FIG. 1 shows the inventive range for the Archimedes number as a function of the fill level and three example processes, and also a comparative example.

DETAILED DESCRIPTION OF THE INVENTION

FIG. 1 shows the inventive range for the Archimedes number as a function of the fill level. The curves are shown in double-logarithmic form.

The inventive range is limited by the lines 5 and 6, which specify the maximum and minimum allowed profile of the Archimedes number. Up to FL=5%, these are exponential functions.

The slope of the two curves 5 and 6 up to FL=5% is different in the double-logarithmic plot. Accordingly, the two exponential functions have different exponents.

It is found that the curve for a single process up to FL=5% must fall in order not to leave the allowed range for the Archimedes number for FL>5%.

All processes examined exhibit, at least up to FL=5%, a falling profile, and they behave differently at higher fill levels.

The curves 1, 2 and 3 show three typical profiles of the Archimedes number. The curves 1, 2 and 3 will be described in detail later with reference to examples 1-3.

In curves 1 and 2, it is clear that the Archimedes number at first decreases continuously. This applies at least up to a fill level of 5% as for curve 2, but may also continue up to a higher fill level, for example up to a fill level of about 10% as in curve 1.

In curve 1, the Archimedes number is subsequently constant.

In curve 2, a quite different profile is found. The Archimedes number rises again from FL=5%. Since, in FIG. 1, the double-logarithmic plot has been selected, this is again an exponential function.

In curve 3, the Archimedes number decreases up to a fill level of approx. 7%. Between a fill level of approx. 4% and approx. 7%, the Archimedes number falls to a greater degree than for a fill level of less than approx. 4%. Thus, the profile of the Archimedes number up to a fill level of approx. 4% is an exponential function with an exponent $x_1$, and the profile of the Archimedes number between approx. 4% and 7% is likewise an exponential function with an exponent $x_2$, where $x_2 < x_1$. From a fill level of greater than approx. 7%, the Archimedes number then remains constant.

It is thus found that the profile of the Archimedes number may be quite different as a function of the fill level. The Archimedes number may first fall and then remain substantially constant or else rise again.

It is essential to the invention that the Archimedes numbers do not leave the range defined by the curves 5 and 6 for any fill level.

The inventors have recognized that all processes for which the Archimedes number is outside the range described are associated with considerable disadvantages already known in the prior art.

Comparative Example

Curve 4 shows the Archimedes number as a function of the fill level for the process known from EP 2 067 744 A2.

For all parameters which are required for determination of the Archimedes number and are not disclosed in the application, typical values were assumed or calculated. The nozzle area was calculated from the rate figures and the proportion of closed nozzles.

The results are shown in Table 1.

Points 41, 42, 43, 44, 45 and 46 are shown in FIG. 1.

TABLE 1

| Reactor volume [m³] | Number of rods | Rod length [m] | $T_{wall}$ [K] | $T_{rod}$ [K] |
|---|---|---|---|---|
| 17 | 98 | 1.9 | 393 | 1273 |

| | FL [%] | Q [m³/s] | $A_d$ [m²] | $Ar_n$ |
|---|---|---|---|---|
| | 0.03 | 0.047 | 3.14E−03 | 7740 |
| FIG. 1-41 | 0.50 | 0.126 | 3.14E−03 | 1088 |
| FIG. 1-42 | 0.54 | 0.137 | 2.28E−03 | 667 |

TABLE 1-continued

| FIG. 1-43 | 1.94 | 0.273 | 2.28E−03 | 167 |
|---|---|---|---|---|
| FIG. 1-44 | 3.10 | 0.273 | 2.28E−03 | 167 |
| FIG. 1-45 | 3.21 | 0.261 | 2.90E−03 | 233 |
| FIG. 1-46 | 12.41 | 0.261 | 2.90E−03 | 233 |

The plot of the Archimedes number for the process from EP 2 067 744 A2 is well below the inventive range for the Archimedes number and shows quite different characteristics, which might be attributable to the changes in the inflow rates of the reaction gas.

More particularly, an increased proportion of rods which have fallen over is found here. The deposition rate is also sufficiently high only when a less homogeneous morphology is accepted. The fact that an increase in the Archimedes number could eliminate these problems is surprising.

The process described in DE 29 12 661 A1 also shows a plot of the Archimedes number as a function of the fill level which is below the inventive range (similarly to the process from EP 2 067 744 A2, but without the specific plot thereof). In this process, a two-jet nozzle is used. The following parameters disclosed were used:

TABLE 2

| Reactor volume [m³] | Number of rods | Rod length [m] | $T_{wall}$ [K] | $T_{rod}$ [K] |
|---|---|---|---|---|
| 3 | 8 | 2 | 393 | 1373 |

| | FL [%] | Q [m³/s] | $A_d$ [m²] | $Ar_n$ |
|---|---|---|---|---|
| FIG. 1-7 | 6.89 | 0.0101 | 6.79E−05 | 364 |

Point 7 is shown in FIG. 1.

The advantage described in DE 29 12 661 A1 with regard to the homogeneity of the rod geometry can be observed in such a process, but this process exhibits other considerable disadvantages.

For instance, the specific energy consumption is much higher than in processes which are within the inventive range with regard to the Archimedes number.

In comparison, the specific energy consumption of the inventive processes is 10-20% lower.

In addition, the process likewise exhibits a distinct increase in the proportion of rods which have fallen over.

The proportion of rods which have fallen over in the processes according to DE 29 12 661 A1 and according to EP 2 067 744 A2 is about 50-100% higher than in inventive processes which have a plot of the Archimedes number within the inventive range.

Examples

Three different inventive processes are presented.

Different reactors were used, which differed with regard to reactor volume and number of rods.

In one of the processes (example 1), a reactor with 48 rods and a reactor volume of 12.7 m³ was used. In the other process (example 2), deposition was effected on to 24 rods in a reactor volume of 10 m³.

In the third process (example 3), the reactor volume was only 5.9 m³, but likewise with 24 rods.

The rod length in all processes was 2.9 to 3.1 m.

Table 3 lists the parameters of the three points 11, 12 and 13 of the curve 1 shown in FIG. 1.

The wall temperature $T_{wall}$ was constant at 393 K. The cross-sectional area of the nozzles was constant at $4.185 \times 10^{-3}$ m².

In the second column, the fill level of the reactor is shown. The rod temperature $T_{rod}$ declined from 1326K at a fill level of 0.16% to 1302K at a fill level of 19%.

Q denotes the volume flow of the reaction gas (trichlorosilane and hydrogen) under operating conditions in m³/s. This at first increases and then remains constant.

$Ar_n$ denotes the Archimedes number.

In this case, the Archimedes number remains essentially constant between a fill level of 10.76% and a fill level of 19.06%. This also applies to the volume flow of the reaction gas, which remains constant at 0.192 m³/s.

TABLE 3

| Curve 1 FIG. 1 | $T_{wall}$ [K] | FL [%] | $T_{rod}$ [K] | Q [m³/s] | $A_d$ [m²] | $Ar_n$ |
|---|---|---|---|---|---|---|
| 11 | 393 | 0.16 | 1326 | 0.043 | $4.185 \times 10^{-3}$ | 21749 |
| 12 | 393 | 10.76 | 1302 | 0.192 | $4.185 \times 10^{-3}$ | 1097 |
| 13 | 393 | 19.06 | 1299 | 0.192 | $4.185 \times 10^{-3}$ | 1100 |

Table 4 lists the parameters of three points 21, 22 and 23 on the curve 2 (example 2) shown in FIG. 1. The wall temperature $T_{wall}$ in the reactor, in this case too, was constant at 393 K. The cross-sectional area of the nozzles also remained constant, in this case at $2.161 \times 10^{-3}$ m².

The rod temperature $T_{rod}$ declined from 1364 K at a fill level of 0.106% to 1306 K at a fill level of 17.98%. In this case, the Archimedes number rises from 1332 to 2671 between a fill level of 5.03% and a fill level of 17.98%.

TABLE 4

| Curve 2 FIG. 1 | $T_{wall}$ [K] | FL [%] | $T_{rod}$ [K] | Q [m³/s] | $A_d$ [m²] | $Ar_n$ |
|---|---|---|---|---|---|---|
| 21 | 393 | 0.106 | 1364 | 0.027 | $2.161 \times 10^{-3}$ | 18121 |
| 22 | 393 | 5.03 | 1342 | 0.099 | $2.161 \times 10^{-3}$ | 1332 |
| 23 | 393 | 17.98 | 1306 | 0.069 | $2.161 \times 10^{-3}$ | 2671 |

Table 5 lists the parameters of four points 31, 32, 33 and 34 on the curve 3 (example 3) shown in FIG. 1. The wall temperature $T_{wall}$ in the reactor, in this case too, was constant at 393 K. The cross-sectional area of the nozzles also remained constant, in this case at $8.18 \times 10^{-4}$ m².

The rod temperature declined from 1299 K at a fill level of 0.197% to 1233 K at a fill level of 21.1%.

In curve 3 (example 3), the Archimedes number declines between a fill level of 3.604% and a fill level of 6.5% to a greater degree than for a fill level of less than 3.604%.

From a fill level of 6.5%, the plot of the Archimedes number is essentially constant. Here, the volume flow of the reaction gas also remains constant at 0.058 m³/s.

TABLE 5

| Curve 3 FIG. 1 | $T_{wall}$ [K] | FL [%] | $T_{rod}$ [K] | Q [m³/s] | $A_d$ [m²] | $Ar_n$ |
|---|---|---|---|---|---|---|
| 31 | 393 | 0.197 | 1299 | 0.01 | $8.18 \times 10^{-4}$ | 40599 |
| 32 | 393 | 3.604 | 1272 | 0.031 | $8.18 \times 10^{-4}$ | 4173 |
| 33 | 393 | 6.5 | 1262 | 0.058 | $8.18 \times 10^{-4}$ | 1135 |
| 34 | 393 | 21.1 | 1233 | 0.058 | $8.18 \times 10^{-4}$ | 1120 |

What is claimed is:

1. A process for producing polycrystalline silicon, comprising introduction of a reaction gas comprising a silicon-containing component and hydrogen through one or more nozzles into a reactor comprising at least one heated filament rod on which silicon is deposited, wherein an Archimedes number $Ar_n$, which describes flow conditions in the reactor as a function of a fill level FL which states a ratio of a rod volume to an empty reactor volume in percent, for a fill level FL of up to 5% is within a range limited at a lower end by a function $Ar = 2000 \times FL^{-0.6}$ and at an upper end by a function $Ar = 17000 \times FL^{-0.9}$, and at a fill level of greater than 5% is within a range from at least 750 to at most 4000.

2. The process as claimed in claim 1, wherein the Archimedes number declines down to a fill level of 4.5-5.5% and remains constant at a higher fill level.

3. The process as claimed in claim 1, wherein the Archimedes number declines down to a fill level of 6.5-7.5% and then remains constant, and declines to a greater extent from a fill level of more than 4.5% than at a fill level of 1-3%.

4. The process as claimed in claim 1, wherein the Archimedes number declines down to a fill level of 4.5-5.5% and rises at a higher fill level.

5. The process as claimed in claim 1, wherein the reactor volume is bounded by a wall whose temperature is 300 K to 700 K.

6. The process as claimed in claim 1, wherein a temperature measured on a side of the at least one heated filament rod on which silicon is deposited facing the wall of the reactor and at half a height of one length of the at least one heated filament rod on which silicon is deposited is 1150 K to 1600 K.

7. The process as claimed in claim 1, wherein the at least one heated filament rod on which silicon is deposited is removed from the reactor after silicon deposition and processed mechanically to give silicon chunks.

8. A method for producing a single silicon crystal by zone melting, said method comprising:
    (a) providing polycrystalline silicon by the process of claim 1; and
    (b) conducting zone melting steps on the polycrystalline silicon to produce the single silicon crystal.

9. A method for producing a single silicon crystal by crystal pulling according to a Czochralski process, said method comprising:
    (a) providing polycrystalline silicon by the process of claim 1; and
    (b) conducting the crystal pulling according to the Czochralski process on the polycrystalline silicon to produce the single silicon crystal.

10. A method for producing a silicon crystal by block casting, said method comprising:
    (a) providing polycrystalline silicon by the process of claim 1; and
    (b) conducting block casting steps on the polycrystalline silicon to produce the silicon crystal.

* * * * *